(12) United States Patent
Stamatovski (10) Patent No.: US 11,661,190 B2
(45) Date of Patent: May 30, 2023

(54) RAPID AIRCRAFT INSPECTION WITH AUTONOMOUS DRONE BASE STATION SYSTEMS

(71) Applicant: Easy Aerial Inc., Brooklyn, NY (US)

(72) Inventor: Ivan Stamatovski, Long Island City, NY (US)

(73) Assignee: EASY AERIAL INC., Brooklyn, NY (US)

( * ) Notice: Subject to any disclaimer, the term of this patent is extended or adjusted under 35 U.S.C. 154(b) by 284 days.

(21) Appl. No.: 16/937,937

(22) Filed: Jul. 24, 2020

(65) Prior Publication Data

US 2022/0024577 A1    Jan. 27, 2022

(51) Int. Cl.

| | |
|---|---|
| *B64C 39/02* | (2023.01) |
| *B64F 5/60* | (2017.01) |
| *B64F 3/00* | (2006.01) |
| *G05D 1/00* | (2006.01) |
| *G05D 1/12* | (2006.01) |
| *G06T 7/00* | (2017.01) |
| *G05D 1/02* | (2020.01) |
| *G06V 20/10* | (2022.01) |
| *B64U 101/30* | (2023.01) |

(52) U.S. Cl.
CPC .......... *B64C 39/024* (2013.01); *B64C 39/022* (2013.01); *B64F 3/00* (2013.01); *B64F 5/60* (2017.01); *G05D 1/0094* (2013.01); *G05D 1/0212* (2013.01); *G05D 1/12* (2013.01); *G06T 7/001* (2013.01); *G06V 20/10* (2022.01); *B64U 2101/30* (2023.01); *G06T 2207/30108* (2013.01)

(58) Field of Classification Search
CPC .............. B64C 39/024; B64C 39/022; B64C 2201/123; B64C 2201/148; B64C 2201/208; B64C 39/02; B64F 3/00; B64F 5/60; G05D 1/0094; G05D 1/0212; G05D 1/12; G05D 2201/0207; G05D 1/00; G06T 7/001; G06T 2207/30108; G06T 7/00; G06V 20/10; G06V 10/143; G06V 10/778; G06V 10/82; G06V 20/17; G06V 20/194; G06V 10/454
See application file for complete search history.

(56) References Cited

U.S. PATENT DOCUMENTS

| | | | |
|---|---|---|---|
| 9,505,494 B1 | 11/2016 | Marlow et al. | |
| 9,508,263 B1 | 11/2016 | Teng et al. | |
| 9,611,038 B2 | 4/2017 | Dahlstrom | |
| 9,618,940 B1 | 4/2017 | Michini et al. | |
| 9,678,507 B1 * | 6/2017 | Douglas | G08G 5/0013 |
| 10,081,443 B2 * | 9/2018 | Engel | B64F 5/60 |

(Continued)

*Primary Examiner* — Yonel Beaulieu
(74) *Attorney, Agent, or Firm* — Carter, DeLuca & Farrell LLP (57) ABSTRACT

A system for inspecting an aircraft includes a drone, a base station, and a controller. The drone includes one or more cameras. The base station has a storage compartment configured to store the autonomous drone therein. The controller has a processor and a memory. The memory has instructions stored thereon, which when executed by the processor, cause the base station to drive to a first predetermined location relative to the aircraft, and cause the drone to fly from the storage compartment of the base station to a first predetermined position relative to the aircraft so that the drone can record image data of at least portions of the aircraft with the one or more cameras.

19 Claims, 8 Drawing Sheets

(56) References Cited

U.S. PATENT DOCUMENTS

| | | | |
|---|---|---|---|
| 10,313,575 B1* | 6/2019 | Wingo | B64C 39/024 |
| 10,509,417 B2* | 12/2019 | van Cruyningen | G05D 1/0094 |
| 10,761,525 B2 | 9/2020 | Bethke et al. | |
| 2017/0229022 A1 | 8/2017 | Gurel et al. | |
| 2018/0032088 A1* | 2/2018 | van Cruyningen | G06V 20/10 |
| 2018/0033320 A1* | 2/2018 | Castelli | G08G 5/0078 |
| 2018/0089622 A1* | 3/2018 | Burch et al. | G01S 19/49 |
| 2018/0170414 A1* | 6/2018 | Arndt | B61L 15/0081 |
| 2018/0204469 A1* | 7/2018 | Moster | G05D 1/0094 |
| 2018/0329433 A1* | 11/2018 | Zhao | G05D 1/0094 |
| 2019/0185186 A1* | 6/2019 | Li | G06V 10/757 |
| 2020/0033846 A1* | 1/2020 | Buyse | B64F 1/362 |
| 2020/0180791 A1* | 6/2020 | Kimberly | B64C 39/024 |

* cited by examiner

RAPID AIRCRAFT INSPECTION WITH AUTONOMOUS DRONE BASE STATION SYSTEMS

TECHNICAL FIELD

This disclosure relates to aircraft inspection, and more particularly, to automatic rapid maintenance inspection for large aircrafts.

BACKGROUND

Large areas or objects often require inspection to confirm that such areas or objects conform to a predetermined set of standards. For instance, aircraft bodies, such as military aircraft, require frequent inspection to determine an overall health of the exterior (e.g., paint and/or skin, nuts, rivets, bolts, flaps, etc.) of the aircraft. Currently, these inspections are conducted by personnel pulling up to the aircraft on large cherry pickers or lifts so that they can conduct the inspections by observing the aircraft skin from a few locations around the aircraft. More commonly, such inspections are conducted by scaffolding or ladders if the inspection is outside or by hanging from the ceiling if performed in an aircraft hangar. These aircraft, especially cargo planes, can be as tall as a 5-story building. Some aircraft, the C-5 cargo plane (65 ft height), for instance, can take 48 hours to inspect and requires inspection every 72 hours. Since inspectors need to get on top of the aircraft to fully inspect the aircraft skin, the inspectors have a very dangerous job. Also, it takes a lot of time and effort to prepare personnel with safety gear for working at such heights, to bring out the lifts to the airstrip, and to get them to appropriate positions and heights. Additionally, the aforementioned inspections are limited in certain weather conditions. Wind speeds above 15 knots require that the aircraft be moved into a hangar in order to be inspected. Finally, though the inspectors are well trained, application of inspection criteria are subject to the individual(s) conducting the inspection. Moreover, though there are meticulous inspection records maintained, there is no documented visual record that exists over time. This presents a multitude of challenges when the manufacturer is called to service the aircraft and remediate any defects uncovered during the inspection. In sum, current inspection methods are time consuming, dangerous for the inspectors, constrained by weather and inadequate in terms of objectivity and long-term data documentation.

SUMMARY

In accordance with an aspect of this disclosure, a system for inspecting an aircraft includes an autonomous drone, a slow-moving, self-directed base station, a base station controller, and a drone controller. The autonomous drone includes one or more cameras. The base station has a storage compartment configured to store the autonomous drone therein. The base station controller has a base station processor and a base station memory. The base station memory has instructions stored thereon, which when executed by the base station processor, cause the base station to drive to a first predetermined location relative to the aircraft and open the storage compartment. The drone controller has a drone processor and a drone memory. The drone memory has instructions stored thereon, which when executed by the drone processor, cause the autonomous drone to: determine that the storage compartment of the base station is open; take flight from the base station when the storage compartment is open; fly to at least one first predetermined position relative to the aircraft; and record image data of at least portions of the aircraft with the one or more cameras. Upon completion of the inspection, or portion of the inspection, the drone and/or base station can return, on its own, to a home location such as a hangar.

In aspects, the base station may include one or more doors that provide access to the storage location. The one or more doors may open upwardly and outwardly to expose the storage compartment.

In aspects, when executed by the drone processor, the instructions stored on the drone memory may further cause the autonomous drone to fly to a second predetermined position relative to the aircraft.

In aspects, the autonomous drone may be tethered to the base station.

In aspects, when executed by the drone processor, the instructions stored on the drone memory may further cause the autonomous drone to return to the base station.

In aspects, when executed by the base station processor, the instructions stored on the base station memory may further cause the base station to drive to a second predetermined location.

In aspects, wherein, when executed by the base station processor, the instructions stored on the base station memory may further cause the at least one door of the base station to close when the autonomous drone returns to the base station.

In aspects, the base station may be configured to communicate with the autonomous drone.

In aspects, the system may further comprise a central server configured to communicate with one or both of the autonomous drone and the base station.

According to yet another aspect, a method for inspecting an aircraft is provided. The method includes causing a base station to autonomously drive to a first predetermined location relative to an aircraft, causing a drone supported by the base station to autonomously take flight from the base station, causing the drone to autonomously fly to a first predetermined position relative to the aircraft, and causing the drone to inspect the aircraft by recording image data (e.g., video and/or picture data) of at least a portion of the aircraft when disposed in the first predetermined position.

In aspects, the method may further include causing a controller operatively coupled to the drone to compare the image data to predetermined image data and determine if the image data meets predetermined standards, and if the controller determines that the image data does not meet the predetermined standards, causing the controller to display an alert.

In aspects, the controller may compare the image data to previously stored image data to determine an amount of wear and tear based on differences between the image data and the previously stored image data.

In aspects, the method may further include causing the base station to selectively provide access to a storage compartment that supports the drone therein.

In aspects, the method may further include causing the drone to autonomously fly to a second predetermined position relative to the aircraft.

In aspects, the method may further include maintaining the drone tethered to the base station.

In aspects, the method may further include causing the base station to autonomously drive to a second predetermined location relative to the aircraft.

In accordance with yet another aspect, a system for inspecting an aircraft includes a drone, a base station, and a controller. The drone includes one or more cameras and/or sensors. The base station has a storage compartment configured to store the autonomous drone therein and helps to protect the drone, for example, from weather. The base station can also include internal cameras that enable operators to inspect the drone, power and data management, etc. The controller has a processor and a memory. The memory has instructions stored thereon, which when executed by the processor, cause the base station to drive to a first predetermined location relative to the aircraft, and cause the drone to fly from the storage compartment of the base station to a first predetermined position relative to the aircraft so that the drone can record image data of at least portions of the aircraft with the at least one camera.

In aspects, when executed by the processor, the instructions may further cause the drone to fly to a second predetermined position relative the aircraft.

In aspects, when executed by the processor, the instructions may further cause the base station to drive to second predetermined location (providing continuous video imaging and data collection, constant surveillance, while its moving from one position to the next). The drone and base station system can continue in this manner through a complete airplane specific path, recording video and snapping inspection pictures of the entire aircraft, or portions thereof. The system will then returns to its home/docking station (e.g., hangar). In aspects, this system can operate similar to robotic vacuum system (e.g., Roomba™) where drone and base station system leaves a docking station on its own, conducts inspection on its own, and returns to the docking station on its own.

In aspects, the drone may be tethered to the base station.

In aspects, when executed by the processor, the instructions may further cause the controller to compare the recorded image data of at least one portion of the aircraft to previously recorded image data of the at least one portion of the aircraft to determine changes in a condition of the at least one portion of the aircraft.

Other aspects, features, and advantages will be apparent from the description, the drawings, and the claims that follow.

BRIEF DESCRIPTION OF THE DRAWINGS

The accompanying drawings, which are incorporated in and constitute a part of this specification, illustrate aspects of this disclosure and, together with a general description of this disclosure given above, and the detailed description given below, serve to explain the principles of this disclosure, wherein.

DETAILED DESCRIPTION

Aspects of this disclosure are described in detail with reference to the drawings, in which like reference numerals designate identical or corresponding elements in each of the several views.

For purposes of promoting an understanding of the principles of this disclosure, reference will now be made to exemplary aspects illustrated in the drawings, and specific language will be used to describe the same. It will nevertheless be understood that no limitation of the scope of this disclosure is thereby intended. Any alterations and further modifications of the inventive features illustrated herein, and any additional applications of the principles of this disclosure as illustrated herein, which would occur to one skilled in the relevant art and having possession of this disclosure, are to be considered within the scope of this disclosure.

As used herein, the term "slow-moving" or the like means less than 10 miles per hour (mph) and, in some aspects, may mean less than 5 mph.

In the following description, well-known functions or constructions are not described in detail to avoid obscuring the present disclosure in unnecessary detail.

As used herein, the term aircraft includes manned and unmanned aerial vehicles, VTOL (vertical takeoff and landing), air blimps, helicopters, multicopters, drones, airplanes, hot air balloons, etc.

In general, this disclosure is directed to, self-driving or self-directed (e.g., driverless and/or unmanned) base stations that include autonomous tethered and/or un-tethered drones for inspecting objects such as aircraft skin. The disclosed base stations may be in the form of a self-driving platform that supports one or more drones therein. The disclosed base stations are configured to drive to a predetermined area such as along a runway or in a hangar so that the base station can park itself (e.g., next to an aircraft) in a first pre-determined location. An autonomous drone can be deployed from the base station to capture a photo and/or video record of the skin of the aircraft. The drone may be configured to travel to any number of preprogrammed positions relative to the aircraft for effectuating the inspection or recording (e.g. video and/or photo images) of the aircraft. In aspects, a drone may not land in base station until an inspection is complete. In one example, the drone and/or self-driving platform may have a preprogrammed (e.g., software) inspection route (e.g., an oval around an aircraft, parallel along a side thereof, etc.). The preprogrammed inspection route can be the same and/or different (e.g., size, shape, timing, positioning etc.) for each type of aircraft. For instance, the disclosed drone base station systems can be preprogrammed with any number of positions so that an operator is not required to—but may be able to—change or otherwise configure drone and/or base station positions. Rather, disclosed drone base station systems may be configured such that the operator only would need to select, for example, aircraft type and/or location, and the disclosed drone base station systems will then autonomously effectuate the motion control of the drone base station system during inspection and/or inspection of the aircraft while the drone base station system moves along one or more predetermined inspection paths preprogrammed in executable (e.g., via a processor) software instructions stored on memory.

The drone can return to the base station and land inside the self-driving platform, for instance, after travelling to the preprogrammed positions and/or recording such locations. In aspects, the drone may be charged while supported in the self-driving platform. With the drone supported by the self-driving platform, or deployed therefrom, the base station can be configured to move to a second predetermined location relative to the aircraft to enable the drone to travel to any number of preprogrammed positions for effectuating additional recording of the aircraft, which may include one or more of the same and/or different locations associated with the first pre-determined location. Alternatively, and/or additionally, the base station can drive to a docking station such as the hangar, for example, to recharge or store itself, and/or for repair/service.

In aspects, the disclosed base station can include a tethered drone that autonomously takes flight from the self-driving base station to a predetermined altitude for recording portions the aircraft (e.g., a side thereof). The tethered drone can then land back in the base station. In aspects, the tethered drove can be configured to move only vertically relative to the base station (e.g., without lateral movement). While the drone is floating next to the aircraft, the drone can record the external condition using pre-programmed motions or the drone can be remotely controlled by a user (e.g., an inspector) such as over the internet or through a radio controller, etc., for example, to control camera angles, zoom, or when it is OK to move a different position or location such that the drone and/or base station will autonomously travel (fly and/or drive, respectively) to the next position or location once an OK input is received from the operator (e.g., via an interface such as a remote computing device like a laptop or smart phone).

In aspects, the base station can include a non-tethered drone for performing the inspection. Such non-tethered drone may be configured fly and/or hover around the fuselage and into places that may be off limits to a tethered drone, for example, a tail motor cavity of a KC10 aircraft. The non-tethered drone can be configured to complete an inspection in one flight without the need to return to the base station along the body of a plane.

In aspects, the drones include a zoom camera.

Although drones can be used for aircraft inspection in full manual mode, such operation requires a skilled pilot on-site and is not scalable. This disclosure details a base station system that provides at least the following advantages: automated, drone-based aircraft inspection with autonomous flight patterns, self-driving base station with drone for performing one or more inspections, inspection archiving, e.g., in digital format, AI/machine learning based on inspection, and/or comparing current image data with historic image data and/or predetermined standards data. Indeed, the disclosed drone base station systems can create a living history of aircraft inspection, where a current inspection (e.g., image data thereof—photos, videos, etc.) is referenced against previous image data of the same aircraft, at the same place on the body of the aircraft, and where the systems learn over time how to track wear and tear historically and continually improve at determining pass/fail against inspection criteria.

Figure 1:
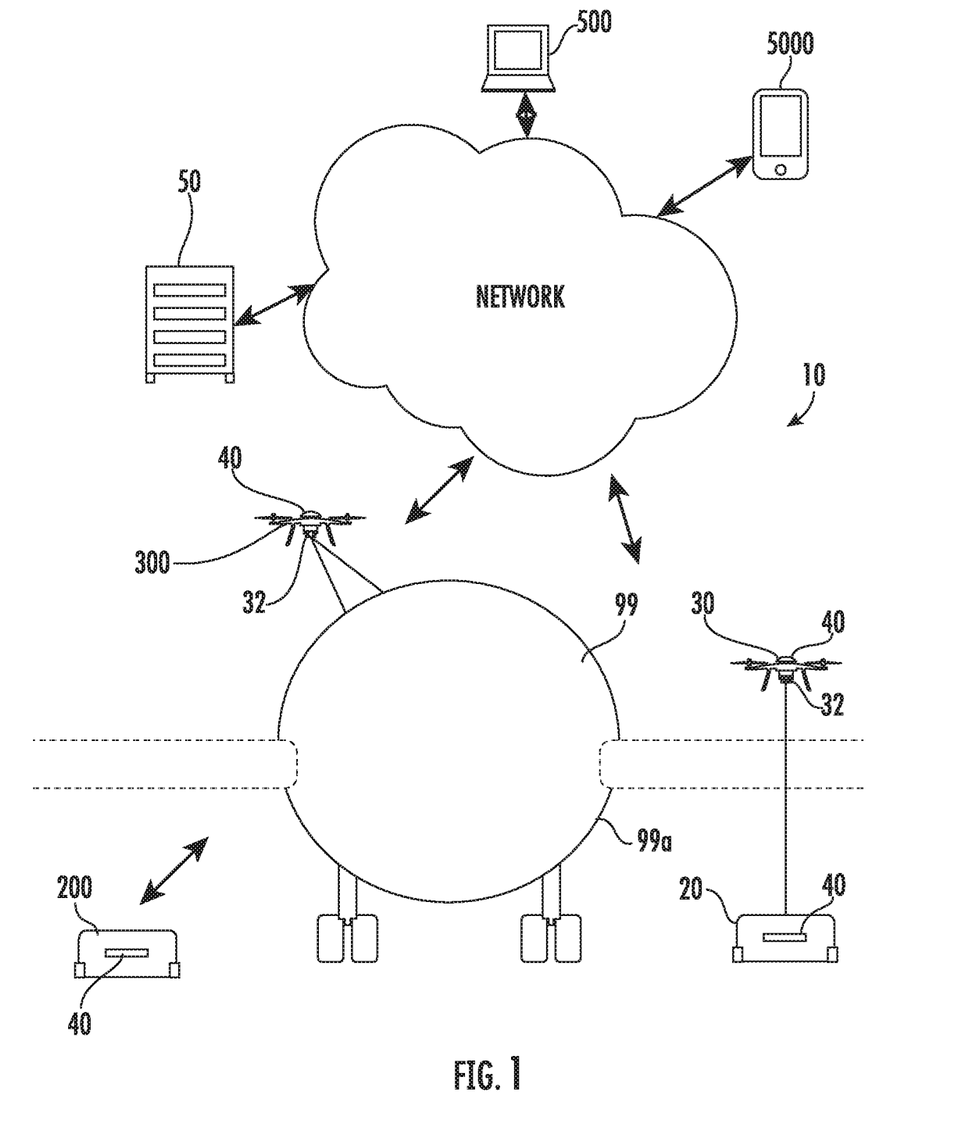
FIG. 1 is a view of a networked environment of a drone base station system including one or more autonomous drone base stations and one or more autonomous drones, the one or more autonomous drones shown inspecting an airplane skin in accordance with the principles of this disclosure.

Turning now to FIG. 1, an unmanned drone base station system, which is may be the form of an autonomous and/or semi-autonomous vehicle, in accordance with this disclosure, is generally referred to as drone base station system 10. Drone base station system 10 includes one or more drone base stations, such as base stations 20 and 200 that are configured to move slowly (e.g., less than 10 mph and, in some aspects, less than 5 mph), and one or more autonomous (and/or semi-autonomous) drones, which may be in the form of a tethered drone 30 or an untethered drone 300 (e.g., a drone-in-a box system). Drone base station system 10 and/or components thereof includes one or more computing systems that can be networked together. For example, drone base station system 10 can include one or more controllers 40, servers 50 and/or other computing devices 500, 5000 (e.g., laptops, tablets, mobile devices, desktops, and/or any suitable IoT device) for selectively storing, processing, transmitting, and/or receiving data. For instance, drone base station system 10 can be configured to inspect an object, such as an airplane 99, via sensors 32 (e.g., a camera, scanner, etc.), for determining and/or identifying changes in a condition of the exterior 99a of airplane 99, such as between flights (e.g., a full mechanical inspection). The exterior of aircraft can include the skin, paint, rivets, nuts, bolts, flaps, windows, landing gear, sensors, lights, rudders, wings, or any other aircraft component). In this regard, if such inspection reveals that the condition of the exterior 99a does not meet predetermined standards, such as by being significantly chipped or damaged, the exterior 99a can be repaired, as necessary.

Briefly, to help facilitate inspection, drones 30, 300 can include one or more lighting devices and/or sensors 32 (e.g., LEDs, cameras, scanners, etc.) for collecting data (high resolution) such as image data like video and/or pictorial data (e.g., real-time and at any and all angles relative to the aircraft and/or base station). The data is available real-time to, for example, a maintenance team and/or authorized personnel. Such data is stored and compared over time to help identify material changes in conditions of the aircraft, or portions thereof. These sensors can include one or more analog and/or digital cameras, which may be zoom cameras. In aspects, such lighting devices and/or sensors/cameras can include optical cameras, light sources, scanners, IR cameras, etc. For instance, the disclosed scanners can include a structured light (or laser) scanner. The structured light scanner may employ infrared light so as to avoid interference from visible light sources, although it is contemplated that the structured light scanner may emit light in the visible spectrum, or any other wavelength or frequency band, depending upon the object being scanned. In embodiments, light may be provided in a range of visible or IR spectrum. For example, in the visible spectrum a frequency band may be the entire visible spectrum (e.g., white light) or a specific color frequency (e.g., green). The structured light source is selectively positionable in one or more positions, which may be predetermined, relative to one or more cameras (e.g., IR cameras and/or optical cameras) of the disclosed systems.

In aspects, a structured light source may be provided which enables the calculation of the exact location of the intersection between the light ray from the structured light source and the one or more cameras of the system. This information can be scanned as single points, lines, or arrays to create topologic maps of surfaces. In embodiments, the structured light source is that of a light emitting diodes (LED) or LED infrared laser that is dispersed into a scan pattern (e.g., line, mesh, dots, etc.), by rotating mirror, beam splitter, diffraction grating, and/or panning. In one embodiment, the structured light source may be an LED laser having collimated light. The laser scanner will enable visualization systems to achieve accurate surface maps of an object such as the aircraft fuselage in order to match predetermined computed images to images captured during an inspection that are generated by one or more cameras of the disclosed systems. In embodiments, a user may enter in commands or control a structured light pattern projected from any of the disclosed scanners using any suitable user input device (e.g., touchscreen, mouse, keyboard, or the like).

The IR light may also be projected in a predetermined pattern (e.g., a grid or shaped pattern) and/or may be projected toward a target such as an object surface. The IR light may be configured to strike the target and/or surrounding area. One or more of the beams may be projected at varying distances from one another, to increase or decrease the precision of each IR image. For example, in embodiments, the IR light may form one or more patterns such as preselected geometric images (e.g., stripes, random or structured placements of dots). Based on the desired level of accuracy, the patterns may be varied in complexity, having greater amounts of angles, positioned closer to one another, etc. Patterns may also be selected to optimize later analysis of the IR light once captured.

Further, any of the disclosed optical cameras may be visual-light optical cameras, such as a charge-coupled device (CCD), complementary metal-oxide-semiconductor (CMOS), N-type metal-oxide-semiconductor (NMOS), or other suitable cameras known in the art. In embodiments, an optical camera may be a CCD camera having a resolution of 1080p, although any suitable resolution may be provided. In some embodiments, any of the disclosed systems may include a digital filter (not shown) or a filter having narrow band optical grating (not shown). In some embodiments, visible light is filtered from the image captured by one or more of the disclosed optical cameras and transmitted to the user such that any captured image is clear and free from extraneous light patterns. The optical light transmitters may be LEDs that emit white light, although any suitable light emitting device may be utilized. In some embodiments, the optical light transmitters may include RGB LEDs to provide the ability to generate an infinite range of different visible light spectrum. In some aspects of the disclosure, the optical light transmitters are configured to fade between and/or discretely switch between various subsets of the visible spectrum. In certain embodiments, the optical light transmitters may provide RGB, IR, UV, or combinations thereof (e.g., RGB and IR combination LEDs, RGB and UV combination LEDs, and/or IR and UV combination LEDs).

Any of the disclosed IR cameras may be CCD cameras capable of detecting IR light (for example, as reflected), although it is contemplated that the IR cameras may have sufficiently wide optical capture spectrum to detect visible light, such as visible green light or the like, depending upon the surface being scanned.

It is contemplated that any of the disclosed cameras may be any thermographic camera known in the art, such as such as ferroelectric, silicon microbolometer, or uncooled focal plane array (UFPA), or may be any other suitable visible light camera such as a charge-coupled device (CCD), complementary metal-oxide-semiconductor (CMOS), N-type metal-oxide-semiconductor (NMOS), or other suitable camera where the light emitted from any of the disclosed scanners is in the visible or detectable spectrum.

In embodiments, any of the disclosed cameras, scanners, or transmitters may include one or more transparent protective covers (not shown) capable of inhibiting fluids or other contaminants from coming into contact with the disclosed cameras, scanners, or transmitters. In some embodiments, any of the disclosed cameras, scanners, or transmitters may include one or more coatings or layers with hydrophobic properties such as silicones or HDMSO Plasma depositions. In certain embodiments, the covers may include raised geometry that sheds, or washes fluids ejected onto the cover (e.g., rain).

For a more detailed description of drones and components thereof, one or more components of which can be incorporated into, or modified for use with, the drones of this disclosure, reference can be made, for example, to U.S. Patent Application Publication Nos. US2016/0318607 and US2020/0148348, the entire contents of each of which are incorporated by reference herein. For a more detailed description of an autonomous vehicle and components thereof, one or more components of which can be incorporated into, or modified for use with, the drone base station systems of this disclosure, reference can be made, for example, to U.S. Patent Application Publication No. US2019/0033883, the entire contents of which are incorporated by reference herein.

Figure 2A:
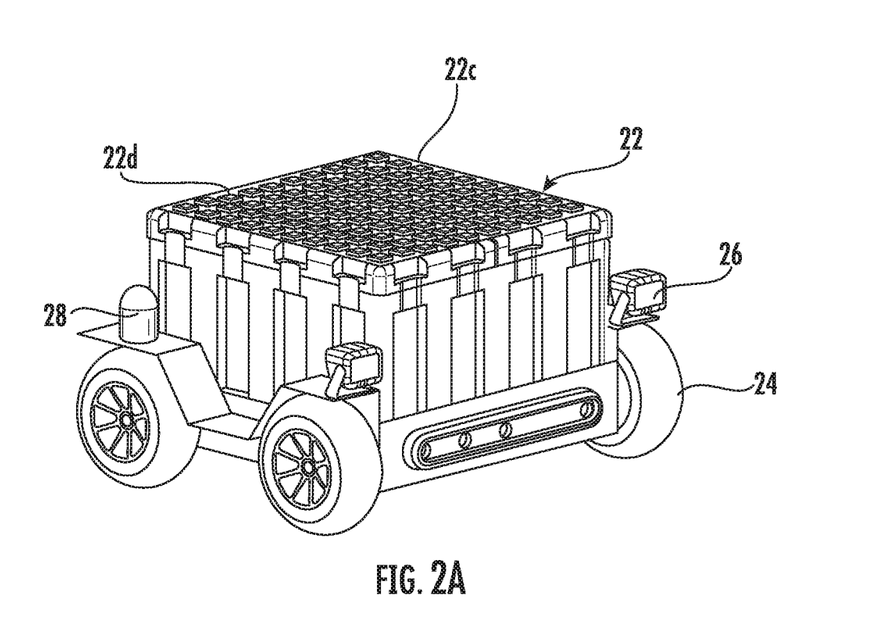
FIG. 2A is a perspective view of an autonomous drone base station of the drone base station system FIG. 1 illustrated with a drone storage compartment thereof shown in a closed position.
Figure 2B:
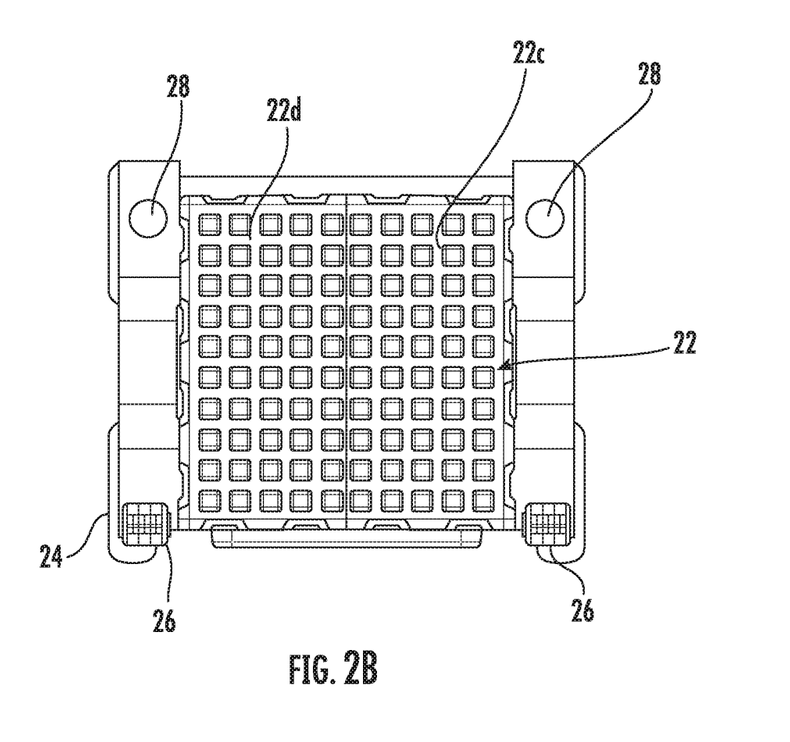
FIG. 2B is a top view of the autonomous drone base station of FIG. 2A.

Referring to FIGS. 2A, 2B, 3A, 3B, 4, and 5, base stations 20, 200, which are in the form of a conveyance system, include a body 22 including a drone container 22a with a storage compartment 22b defined therein for supporting one or more drones 30, 300. Body 22 is shown with a rectangular configuration, although any suitable configuration may be provided. Drone container 22a includes doors 22c, 22d that cover a top portion of storage compartment 22b and which are selectively openable to enable drones 30, 300 to be secured within storage compartment 22b. Doors 22c, 22d may be hingedly connected to sidewalls of drone container 22a to enable doors 22c, 22d to move between an open position (FIG. 3A) and closed position (FIG. 2A). Doors 22c, 22d are coupled to actuators 22e (e.g., pneumatic, hydraulic, etc.) that facilitate the opening and/or closing of doors 22c, 22d in response to a request (e.g., an electrical signal) from a controller 40 of, for example, base station 20.

Figure 3A:
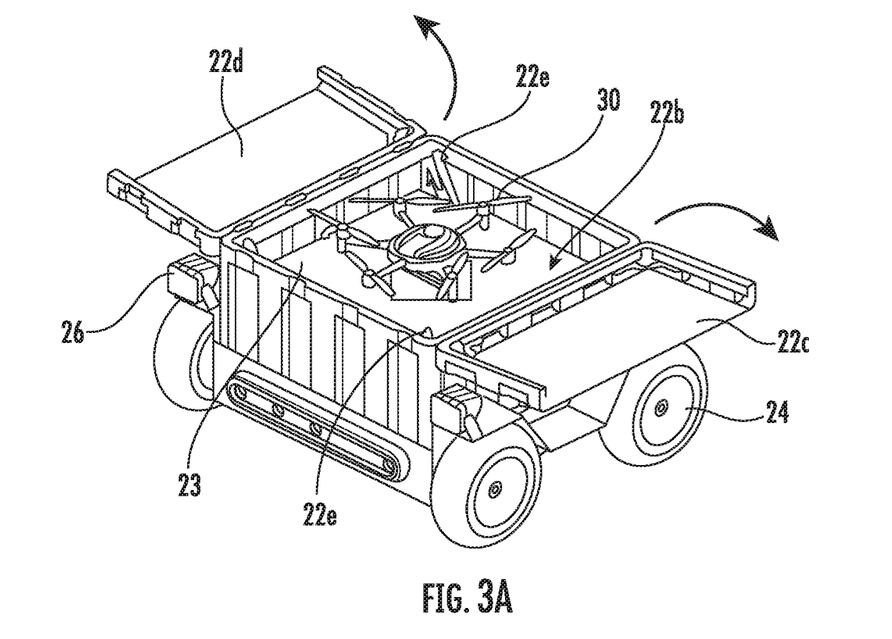
FIG. 3A is a perspective of the autonomous drone base station of FIG. 2A with the drone storage compartment thereof shown in an open position and supporting a tethered drone of the drone base station system of FIG. 1 therein.
Figure 3B:
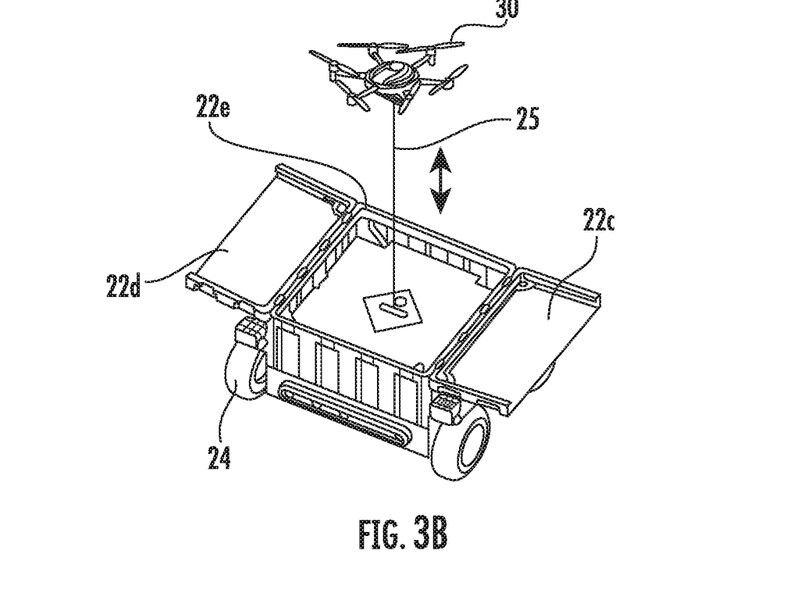
FIG. 3B is another view of FIG. 3A with the tethered drone shown flying above the autonomous drone base station.
Figure 4:
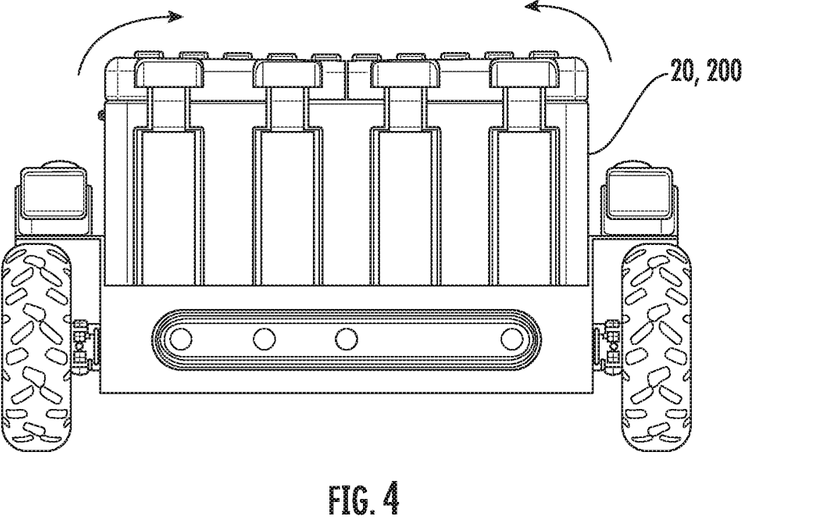
FIG. 4 is a front view of the autonomous drone base station of FIG. 2A with the drone storage compartment thereof shown in the closed position with the tethered drone enclosed therein.
Figure 5:
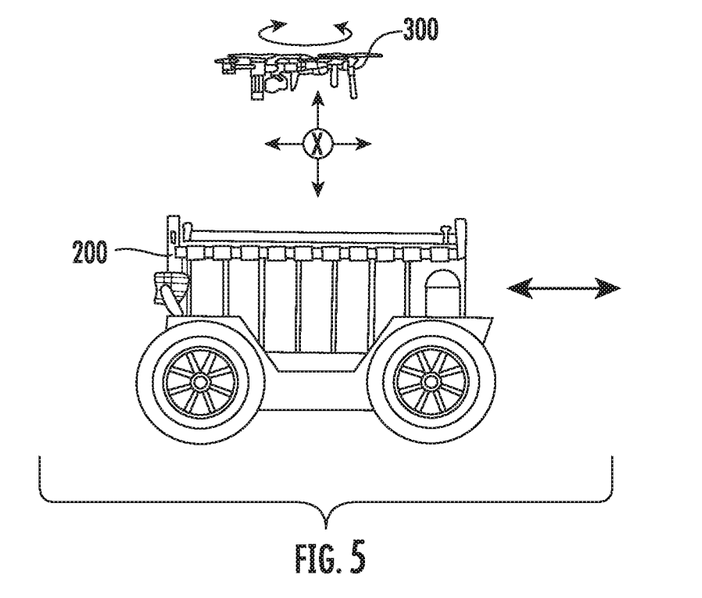
FIG. 5 is a side view of another autonomous drone base station and an autonomous, untethered drone of the drone base station system of FIG. 1, the untethered drone shown flying above the autonomous drone base station.

Storage compartment 22b can include a platform 23 supported therein for supporting drones 30, 300 and/or for protecting mechanical and/or electrical components that operate base stations 20, 200 and/or components thereof. A tether 25 may extend from and/or through platform 23 for keeping drone 30 secured to base station 20. In aspects, tether 25 may include electrical wiring/cabling for powering drones 30 and/or enabling communication between drone 30 and base station 20, for example. Tether 25 may include lights (e.g., LEDs) therealong (e.g., at spaced-apart locations). Tether 25 may be provided in any suitable length such as 300 ft (or larger and/or smaller).

Base stations 20, 200 further include a drive system 24 with any suitable electrical and/or mechanical components for enabling base stations 20, 200 to drive in any suitable direction including forward, backward, and/or turning directions and, of course braking. For example, drive system 24 can include any number of motors, axels, wheels, transmission, brakes, circuitry (e.g., controllers, chips, wiring, electronics), power supply, gears, pulleys, cables, shafts, exhaust, cooling, etc., which may be secured to body 22 for enabling base stations 20, 200 to drive. Base stations 20, 200 further include any number of lighting devices 26 and/or sensors 28 (e.g., LIDAR) to help base stations 20, 200 navigate. Base stations 20, 200 can also provide protect drones from weather, manage charging, power and data, and includes internal cameras and sensors for inspecting the system (e.g., the drones and/or the base station) for functionality.

Figure 6:
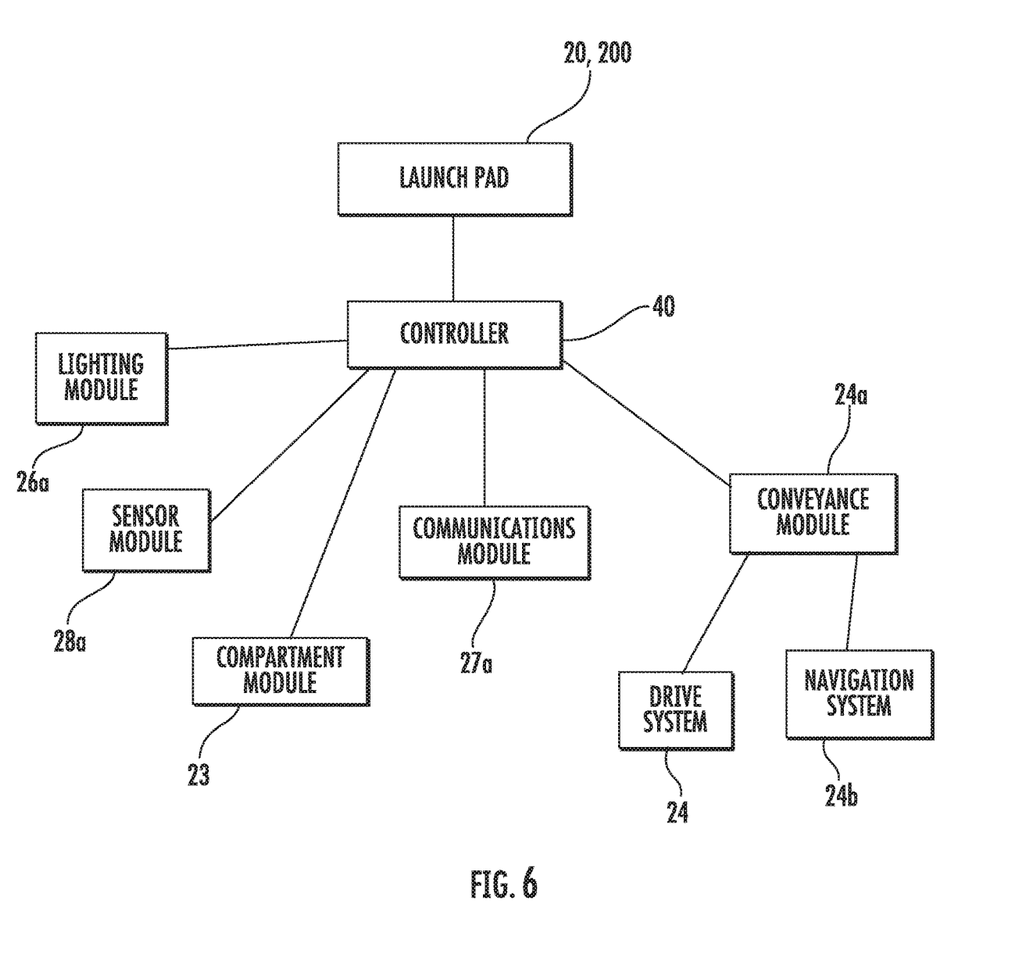
FIGS. 6 and 7 are block diagrams of exemplary components of the base stations and/or autonomous drones of the drone base station system of FIG. 1.
Figure 7:
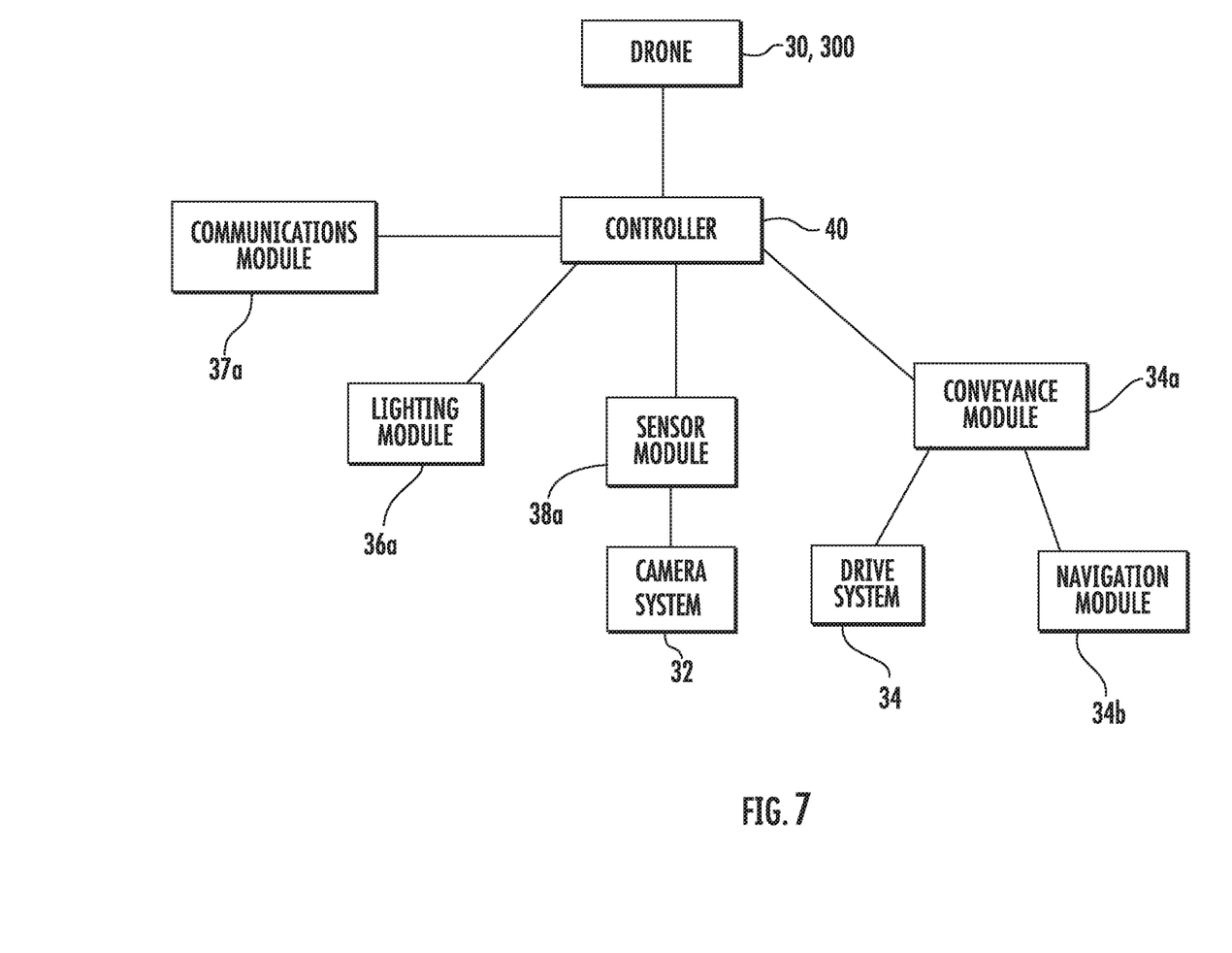

With reference to FIGS. 6 and 7, base stations 20, 200 and/or drones 30, 300 include computing devices and/or controllers 40 that are disposed in electrical communication with various components and/or modules of base stations 20, 200 and/or drones 30, 300 for operating various components of base stations 20, 200 and/or drones 30, 300. For instance, as seen in FIGS. 6 and 7, base stations 20, 200 and/or drones 30, 300 can include a lighting module 26a, 36a for controlling lighting of base stations 20, 200 and/or drones 30, a sensor module 28a, 38a for controlling sensors (e.g., camera system 32) of base stations 20, 200 and/or drones 30, 300, a compartment module 23a for controlling doors 22c, 22d of the storage compartment 22b of base stations 20, 200 (via actuators 22e), a communications module 27a, 37a for communication between base stations 20, 200, drones 30, 300, servers 50, users, and/or other networked devices 500, 5000 (see FIG. 1), and a conveyance module 24a, 34a for enabling base stations 20, 200 and/or drones 30, 300 to drive, fly, etc., and which can control drive systems 24, 34 of base stations 20, 200 and/or drones 30, 300, and/or cooperate with a navigation module 24b, 34b for enabling base stations 20, 200 and/or drones 30, 300 to navigate to various locations.

Figure 8:
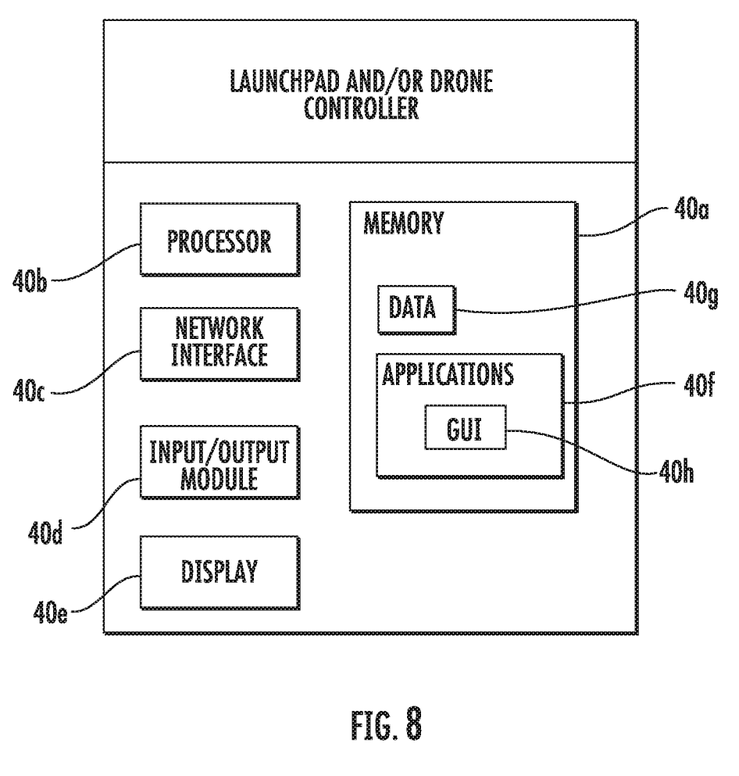
FIG. 8 is a schematic view of an exemplary controller of the autonomous drone base station system of FIG. 1.

With reference to FIG. 8, the computing systems and/or controllers of this disclosure can include memory 40a (and/or storage device), a processor 40b, a network interface 40c, an input/output module 40d, and/or display 40e.

Memory 40a may store one or more applications 40f and/or data 40g. Application 40f (which may be a set of executable instructions) may, when executed by processor 40b, cause display 40e to present a graphical user interface (GUI) 40h based on GUI instructions and/or perform cause processor 40b to perform any other operation associated with the instructions stored thereon. Application 40f may also provide the interface between one or more components of the system (e.g., between one or more of the drones and/or base stations) and the computing system 40, 400, 4000 through, for instance, telecommunication such as LTE, radio communication, and/or Wi-Fi. GUI 40h may be displayed on display 40e during the performance of any of the disclosed methods. Display 40e may include procedural data that may be displayed via GUI 40h such as the state of a drone 30, 300 and/or base station 20, 200 during an inspection procedure (e.g., driving, flying, low battery, location, etc.) and/or otherwise (e.g., operative, in error, or current operating parameters or modes), etc. Display 40e may include AR/VR headsets.

Memory 12a may include any non-transitory computer-readable storage media for storing data and/or software (instructions) executable by processor 40b and which controls the operation of various components of the system, when in communication therewith (e.g., base station, drones, and/or components thereof such as sensors, navigation modules, power systems, conveyance systems, etc.).

In aspects, memory 40a may include one or more solid-state storage devices such as flash memory chips. Alternatively, and/or additionally, to the one or more solid-state storage devices, memory 40a may include one or more mass storage devices connected to processor 40b through a mass storage controller (not shown) and a communications bus (not shown). Although the description of computer-readable media contained herein refers to a solid-state storage, it should be appreciated by those skilled in the art that computer-readable storage media can be any available media that can be accessed by processor 40b. That is, computer readable storage media includes non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by the computing systems 40, 400, 4000 of this disclosure.

Network interface 40c may be configured to connect to a network such as a local area network (LAN) including a wired network and/or a wireless network, a wide area network (WAN), a wireless mobile network, a Bluetooth network, and/or the Internet. Input/output module 40d may include an input device through which a user may interact with computing systems 40, 50, 500, 5000 of this disclosure, such as, for example, a mouse, keyboard, foot pedal, touch screen, and/or voice interface. Input/output module 40d may include an output device which may include any connectivity port or bus, such as, for example, parallel ports, serial ports, universal serial busses (USB), or any other similar connectivity port.

Figure 9:
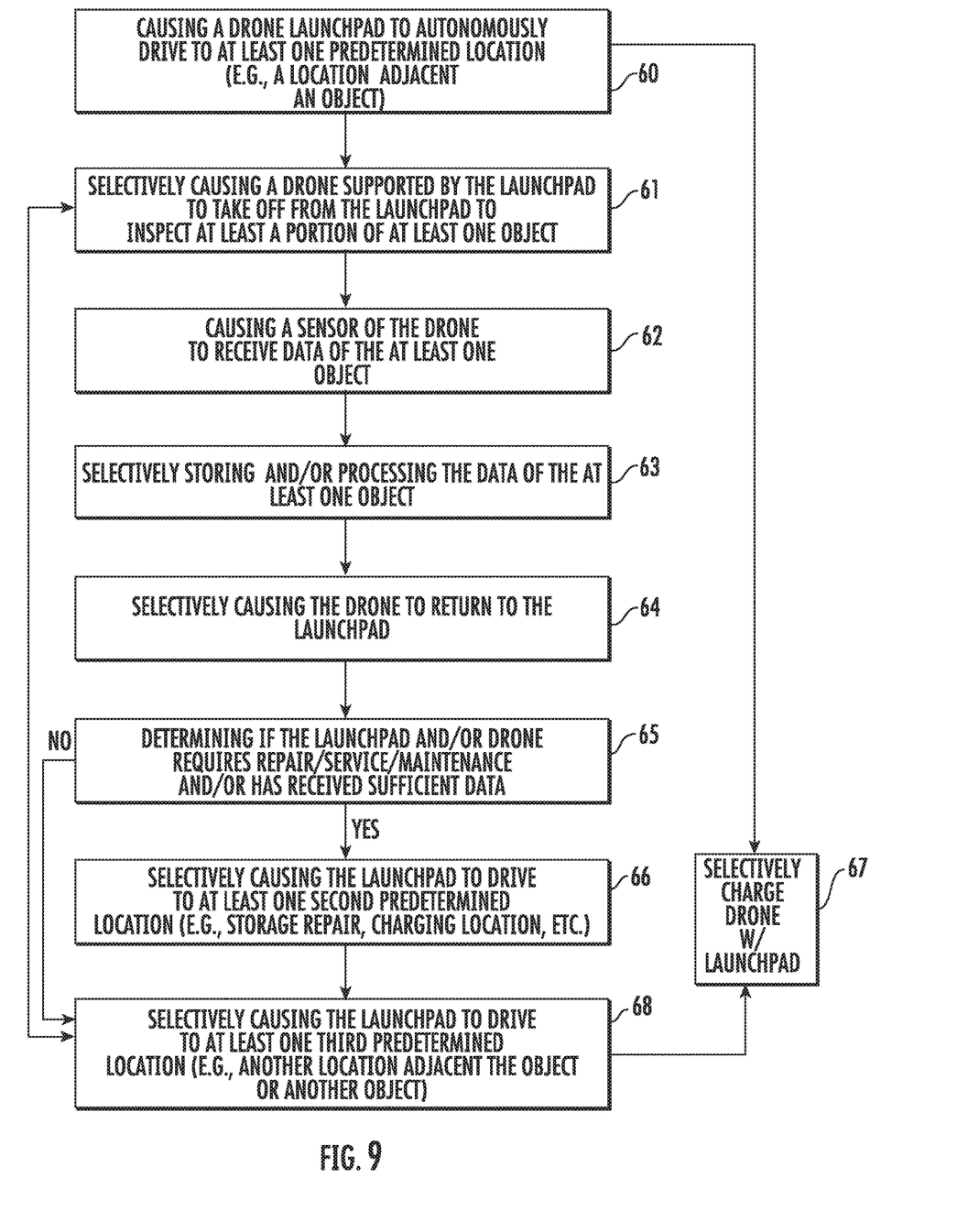
FIG. 9 is a flow diagram illustrating the autonomous drone base station system conducting an inspection process of an object.

Turning now to FIG. 9, a method for inspecting an object is illustrated and includes one or more steps, which may be effectuated in any suitable order (e.g., successively, at any suitable interval, and/or randomly) and may be effectuated as a single step and/or combination of one or more of the steps.

In step 60, one or more drone base stations is caused to autonomously drive to at least one predetermined location (e.g., to a location relative to an object such as an aircraft) for effecting an inspect of the object.

In step 61, one or more drones stored within the base stations are released from the base stations when doors of the base station are opened so that the drones can fly to one or more predetermined locations (e.g., at particular height relative to the object). For instance, a tethered drone may have a predetermined amount of length to maintain the tethered drone at a specific height, for example, along an aircraft.

In step 62, the drones utilize sensors (e.g., cameras) to collect data from the aircraft. For example, the drones can take pictorial and/or video data/images of the skin of the aircraft for inspection purposes.

In step 63, the collected data can be stored one memory and/or processed. In aspects, such data can be compared, by one or more processors, to predetermined data stored on memory (e.g., a database). The predetermined data may include threshold requirements. The processors can analyze the retrieved data in view of the predetermined data and make a determination as to whether the retrieved data meets the threshold requirements. If the retrieved data does not meet the threshold requirements, the processors can output an alert indicating the determination. Alternatively, and/or additionally, the retrieved data can be streamed (and/or stored) for review on a display by a user (e.g., an inspector). In aspects, the retrieved data can be collected for any suitable amount of time including intervals, predetermined durations, and by one or more drones, etc. In aspects, retrieved data can be collected separately and/or continuously. In some aspects, retrieved data collected at different/same times, at different/same locations, and/or by different/same drones can be combined (e.g., digitally stitched together) by processor and stored.

In step 64, the drones can selectively return to the base stations for storage, repair, and/or recharge.

In step 65, one or more of the controllers of one or more of the drones, base stations, and/or servers of the drone base station system can determine if one or more base stations and/or one or more drones require repair, service, maintenance, and/or charge, and/or if a sufficient amount of data is collected by the one or more drones (e.g., for purposes of the inspection). Such determination may be made, for example, by one or more of the controllers when the drones are hoovering/flying and/or when the drones return to the base stations.

In step 66, if the controller(s) determine that any repair/service/maintenance, and/or recharge is required for one or more of the drones and/or base stations, the stored instructions will cause the base station(s) to drive to a predetermined location such as a repair location, a storage location, a charging location, etc.

In step 67, the drones can be charged by the base station. In some aspects, the tether can include electrical wiring/cables for powering and/or electrically communicating between a drone and base station. In some aspects, base station can include one or inductive couplers (e.g., on platform) for inductively charging drones when drones are supported within the storage compartment of the base station.

In step 68, the controllers can cause the base stations to drive to another predetermined location, for example, if insufficient data is collected and/or of the drones need to be moved to a different location for collecting data of another portion of an object (e.g., rear portion of the aircraft after collecting data from a front portion of the aircraft) and/or of a different object.

The disclosed systems can include the following advantages: a full high definition camera for aircraft clarity and detail; ability to inspect rivets/fasteners for panel and paint integrity; indoor and outdoor operational capabilities (e.g., hovering over base station without GPS); nighttime operational capabilities including tethered cable with lights (e.g., LEDs) and/or spotlight, which may be selectively attachable; 360 degree obstacle avoidance; ability to accurately measure damage dimensions with an onboard user interface; provide users with ability to recall and re-use programmed routes for specific aircraft types; base station can be slow moving in predetermined paths (e.g., oval path around a specific aircraft type based on a preprogrammed path); automatically compare findings over time for every aircraft (e.g., every tail number); database access on remote computing devices (e.g., tablet or mobile computers); and generation of automatic reports (e.g., PDF documents).

Moreover, the disclosed structure can include any suitable mechanical, electrical, and/or chemical components for operating the disclosed system or components thereof. For instance, such electrical components can include, for example, any suitable electrical and/or electromechanical, and/or electrochemical circuitry, which may include or be coupled to one or more printed circuit boards. As appreciated, the disclosed computing devices and/or server can include, for example, a "controller," "processor," "digital processing device" and like terms, and which are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In some aspects, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In some aspects, the operating system is provided by cloud computing.

In some aspects, the term "controller" may be used to indicate a device that controls the transfer of data from a computer or computing device to a peripheral or separate device and vice versa, and/or a mechanical and/or electro-mechanical device (e.g., a lever, knob, etc.) that mechanically operates and/or actuates a peripheral or separate device.

In aspects, the controller includes a storage and/or memory device. The storage and/or memory device is one or more physical apparatus used to store data or programs on a temporary or permanent basis. In some aspects, the controller includes volatile memory and requires power to maintain stored information. In various aspects, the controller includes non-volatile memory and retains stored information when it is not powered. In some aspects, the non-volatile memory includes flash memory. In certain aspects, the non-volatile memory includes dynamic random-access memory (DRAM). In some aspects, the non-volatile memory includes ferroelectric random-access memory (FRAM). In various aspects, the non-volatile memory includes phase-change random access memory (PRAM). In certain aspects, the controller is a storage device including, by way of non-limiting examples, CD-ROMs, DVDs, flash memory devices, magnetic disk drives, magnetic tapes drives, optical disk drives, and cloud-computing-based storage. In various aspects, the storage and/or memory device is a combination of devices such as those disclosed herein.

In various embodiments, the memory can be random access memory, read-only memory, magnetic disk memory, solid state memory, optical disc memory, and/or another type of memory. In various embodiments, the memory can be separate from the controller and can communicate with the processor through communication buses of a circuit board and/or through communication cables such as serial ATA cables or other types of cables. The memory includes computer-readable instructions that are executable by the processor to operate the controller. In various embodiments, the controller may include a wireless network interface to communicate with other computers or a server. In embodiments, a storage device may be used for storing data. In various embodiments, the processor may be, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, it is also contemplated that a controller may be remote from the disclosed structure (e.g., on a remote server), and accessible by the disclosed structure via a wired or wireless connection. In embodiments where the controller is remote, it is contemplated that the controller may be accessible by, and connected to, multiple structures and/or components of the disclosed system.

Storage devices of disclosed controllers may store one or more machine learning algorithms and/or models, configured to detect various objects in various environments. The machine learning algorithm(s) may be trained on, and learn from experimental data and/or previously measured data which may be initially input into the one or more machine learning applications in order to enable the machine learning application(s) to identify objects based upon such data. Such data may include object data, environmental data, electromagnetic data, conductivity data, and any other suitable data.

Machine learning algorithms of this disclosure are advantageous for use in identifying objects in various environments at least in that machine learning algorithms may improve the functionality of complex sensor components. Machine learning algorithms utilize the initial input data (e.g., the previous object-identification data, current object-identification data, and/or experimental data), to determine statistical features and/or correlations that enable the identification of unknown objects in various environments by analyzing data therefrom. Thus, with the one or more machine learning algorithms having been trained as detailed above, such can be used to identify objects. More specifically, processor(s) of the disclosed controller(s) are configured, in response to receiving sensed data from sensory circuitry (e.g., from GPS sensors and/or cameras), to input the sensed data into the machine learning algorithm(s) stored in a storage device in order to correctly identify an object.

The terms "artificial intelligence," "data models," or "machine learning" may include, but are not limited to, neural networks, deep neural networks, recurrent neural networks (RNN), generative adversarial networks (GAN), Bayesian Regression, Naive Bayes, Monte Carlo Methods, nearest neighbors, least squares, means, and support vector regression, among other data science, artificial intelligence, and machine learning techniques. Exemplary uses are identifying patterns and making predictions relating to objects in various environments.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the disclosed controllers or on a user device, including for example, on a mobile device, an TOT device, or a server system.

The disclosed system may identify an object in any suitable environment using at least one machine learning algorithm. For example, the disclosed system may use machine learning in order to increase the statistical probability that an object in a predetermined environment will be correctly identified. In various embodiments, by using a machine learning algorithm, various objects in various environments may be identified.

In various embodiments, the neural network may include a temporal convolutional network or a feed-forward network. In various embodiments, the neural network may be trained using one or more of measuring sensor data or identifying patterns in data. In various embodiments, training the machine learning algorithm may be performed by a computing device outside of the disclosed structure (e.g., the ground-based post-processing unit), and the resulting algorithm may be communicated to the disclosed controllers of one or more components of the disclosed systems.

In one aspect of the present disclosure, the algorithms in the present disclosure may be trained using supervised learning. Supervised learning is the machine learning task of learning a function that maps an input to an output based on example input-output pairs. It infers a function from labeled training data consisting of a set of training examples. In supervised learning, each example is a pair consisting of an input object (typically a vector) and a desired output value (also called the supervisory signal). A supervised learning algorithm analyzes the training data and produces an inferred function, which can be used for mapping new examples. In various embodiments, the algorithm may correctly determine the class labels for unseen instances. This requires the learning algorithm to generalize from the training data to unseen situations in a "reasonable" way.

In various embodiments, the neural network may be trained using training data, which may include, for example, different environmental conditions, different object characteristics (e.g., electromagnetism, conductivity, and so forth). The algorithm may analyze this training data, and produce an inferred function that may allow the algorithm to identify unknown objects in any suitable environments, based on the generalizations the algorithm has developed from the training data. In various embodiments, training may include at least one of supervised training, unsupervised training or reinforcement learning.

In various embodiments, the neural network may include, for example, a three-layer temporal convolutional network with residual connections, where each layer may include three parallel convolutions, where the number of kernels and dilations increase from bottom to top, and where the number of convolutional filters increases from bottom to top. It is contemplated that a higher or lower number of layers may be used. It is contemplated that a higher or lower number of kernels and dilations may also be used.

In some aspects, the controller includes a display to send visual information to a user. In various aspects, the display is a cathode ray tube (CRT). In various aspects, the display is a liquid crystal display (LCD). In certain aspects, the display is a thin film transistor liquid crystal display (TFT-LCD). In aspects, the display is an organic light emitting diode (OLED) display. In certain aspects, on OLED display is a passive-matrix OLED (PMOLED) or active-matrix OLED (AMOLED) display. In aspects, the display is a plasma display. In certain aspects, the display is a video projector. In various aspects, the display is interactive (e.g., having a touch screen or a sensor such as a camera, a 3D sensor, a LiDAR, a radar, etc.) that can detect user interactions/gestures/responses and the like. In some aspects, the display is a combination of devices such as those disclosed herein.

The controller may include or be coupled to a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber optic network, a satellite network, and/or an IEEE 802.11a/b/g/n/ac wireless network, among others.

In various aspects, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In some aspects, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Any of the herein described methods, programs, algorithms, applications or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

As can be appreciated, securement of any of the components of the disclosed systems can be effectuated using known securement techniques such welding, crimping, gluing, fastening, etc.

The phrases "in an aspect," "in aspects," "in various aspects," "in some aspects," or "in other aspects" may each refer to one or more of the same or different aspects in accordance with the present disclosure. Similarly, the phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. A system for inspecting an aircraft, the system comprising:
    an autonomous drone including at least one camera;
    a base station having a storage compartment configured to store the autonomous drone therein;
    a base station controller having a base station processor and a base station memory, the base station memory having instructions stored thereon, which when executed by the base station processor, cause the base station to
        drive to a first predetermined location relative to the aircraft; and
        open the storage compartment;
    and
    a drone controller having a drone processor and a drone memory, the drone memory having instructions stored thereon, which when executed by the drone processor, cause the autonomous drone to:
        determine that the storage compartment of the base station is open;
        take flight from the base station when the storage compartment is open;
        fly to a first predetermined position relative to the aircraft;
        record image data of at least portions of the aircraft with the at least one camera; and
        compare the recorded image data of at least one portion of the aircraft to previously recorded image data of the at least one portion of the aircraft to determine changes in a condition of the at least one portion of the aircraft.

2. The system of claim 1, wherein the base station includes at least one door that provides access to the storage location.

3. The system of claim 2, wherein the at least one door opens upwardly and outwardly to expose the storage compartment.

4. The system of claim 1, wherein, when executed by the drone processor, the instructions stored on the drone memory further cause the autonomous drone to fly to a second predetermined position relative to the aircraft.

5. The system of claim 1, wherein the autonomous drone is tethered to the base station.

6. The system of claim 1, wherein, when executed by the drone processor, the instructions stored on the drone memory further cause the autonomous drone to return to the base station.

7. The system of claim 1, wherein, when executed by the base station processor, the instructions stored on the base station memory further cause the base station to drive to second predetermined location.

8. The system of claim 1, wherein, when executed by the base station processor, the instructions stored on the base station memory further cause the at least one door of the base station to close when the autonomous drone returns to the base station.

9. The system of claim 1, wherein the base station is configured to communicate with the autonomous drone.

10. The system of claim 1, further comprising a central server configured to communicate with at least one of the autonomous drones or the base station.

11. A method for inspecting an aircraft, the method comprising:
    causing a base station to autonomously drive to a first predetermined location relative to an aircraft;
    causing a drone supported by the base station to autonomously take flight from the base station;
    causing the drone to autonomously fly to a first predetermined position relative to the aircraft;
    causing the drone to inspect the aircraft by recording image data of at least a portion of the aircraft when disposed in the first predetermined position; and
    causing a controller operatively coupled to the drone to compare the image data to predetermined image data and determine if the image data meets predetermined standards, and if the controller determines that the image data does not meet the predetermined standards, causing the controller to display an alert.

12. The method of claim 11, further comprising causing the base station to selectively provide access to a storage compartment that supports the drone therein.

13. The method of claim 11, further comprising causing the drone to autonomously fly to a second predetermined position relative to the aircraft.

14. The method of claim 11, further comprising maintaining the drone tethered to the base station.

15. The method of claim 11, further comprising causing the base station to autonomously drive to a second predetermined location relative to the aircraft.

16. A system for inspecting an aircraft, the system comprising:
    a drone including at least one camera;
    a base station having a storage compartment configured to store the autonomous drone therein; and a controller having a processor and a memory, the memory having instructions stored thereon, which when executed by the processor, cause the base station to drive to a first predetermined location relative to the aircraft, cause the drone to fly from the storage compartment of the base station to a first predetermined position relative to the aircraft so that the drone can record image data of at least portions of the aircraft with the at least one camera; and cause the controller to compare the recorded image data of at least one portion of the aircraft to previously recorded image data of the at least one portion of the aircraft to determine changes in a condition of the at least one portion of the aircraft.

17. The system of claim 16, wherein, when executed by the processor, the instructions further cause the drone to fly to a second predetermined position relative the aircraft.

18. The system of claim 16, wherein, when executed by the processor, the instructions further cause the base station to drive to second predetermined location.

19. The system of claim 16, wherein the drone is tethered to the base station.

\* \* \* \* \*